(12) United States Patent
Honda

(10) Patent No.: US 7,346,263 B2
(45) Date of Patent: *Mar. 18, 2008

(54) RECORDING/REPRODUCING APPARATUS AND RECORDING/REPRODUCING METHOD

(75) Inventor: Takashi Honda, Kanagawa (JP)

(73) Assignee: Sony Corporation, Tokyo (JP)

( * ) Notice: Subject to any disclaimer, the term of this patent is extended or adjusted under 35 U.S.C. 154(b) by 182 days.

This patent is subject to a terminal disclaimer.

(21) Appl. No.: 11/116,900

(22) Filed: Apr. 28, 2005

(65) Prior Publication Data

US 2005/0201738 A1    Sep. 15, 2005

Related U.S. Application Data

(63) Continuation of application No. 09/271,502, filed on Mar. 18, 1999.

(30) Foreign Application Priority Data

Mar. 20, 1998   (JP) ................................. 10-072679
Jul. 22, 1998    (JP) ................................. 10-206956

(51) Int. Cl.
   *H04N 7/00*   (2006.01)
   *H04N 5/00*   (2006.01)
(52) U.S. Cl. ........................ 386/46; 386/117; 386/125
(58) Field of Classification Search ................ 386/117, 386/46, 107, 124, 125, 45, 52, 38, 35, 4, 386/1
See application file for complete search history.

(56) References Cited

U.S. PATENT DOCUMENTS

| | | | |
|---|---|---|---|
| 5,257,142 A | 10/1993 | Hong | 386/46 |
| 6,118,929 A | 9/2000 | Kawamura et al. | 386/117 |
| 6,144,797 A * | 11/2000 | MacCormack et al. | 386/46 |
| 6,253,023 B1 | 6/2001 | Fukushima et al. | 386/117 |
| 6,449,426 B1 | 9/2002 | Suga et al. | 386/117 |
| 6,937,273 B1 * | 8/2005 | Loui | 348/220.1 |
| 2001/0012067 A1 | 8/2001 | Spitzer et al. | 348/243 |
| 2002/0033888 A1 * | 3/2002 | Yamagami | 348/232 |

FOREIGN PATENT DOCUMENTS

| | | |
|---|---|---|
| JP | 4-367178 | 12/1992 |
| JP | 7-327189 | 12/1995 |
| JP | 8-293956 | 11/1996 |

* cited by examiner

*Primary Examiner*—Robert Chevalier
(74) *Attorney, Agent, or Firm*—Frommer Lawrence & Haug LLP; William S. Frommer; Thomas F. Presson

(57) ABSTRACT

A recording/reproducing apparatus and a recording/reproducing method for reducing a load which must be borne when image data is obtained, enabling a title image to flexibly be processed, information for a sufficiently long time to be recorded and images to collectively be downloaded and arranged to display full information in a floppy disc. The recording/reproducing apparatus incorporates a DV recording/reproducing signal processing circuit for recording/reproducing a signal to and from a recording medium; a PCMCIA I/O/ATA I/F processing circuit for interfacing with the PCMCIA standard; a PCMCIA connector for establishing the connection with an external FDD; key blocks with which input is performed; and a control circuit for controlling the circuits.

12 Claims, 13 Drawing Sheets

RECORDING/REPRODUCING APPARATUS AND RECORDING/REPRODUCING METHOD

This application is a continuation of U.S. application Ser. No. 09/271,502, filed Mar. 18, 1999, which application is incorporated by reference herein.

BACKGROUND OF THE INVENTION

1. Field of the Invention

The present invention relates to a recording/reproducing apparatus incorporating first and second recording mediums to mutually record/reproduce data between the first and second recording mediums.

2. Background of the Invention

An operation for capturing, into a personal computer (PC), an image obtained by a video cassette recorder (VCR) or a camera-integrated video tape recorder (VTR), that is, a so-called camcoder, has been widely performed. Also an operation for editing the captured image has been widely performed.

The foregoing operation for capturing an image has been performed by inserting, into the PC, a video capture board, which is a dedicated substrate for capturing a video image or by establishing the connection with the video capture board on the outside. Moreover, software corresponding to the video capture board has been installed on the PC.

Recently, video cassette recorders and camcoders each having a so-called titler function for inserting a title into the image have been made available. When the titler is used, a required tile can be written on the video image.

On the other hand, an apparatus for directly recording an image on a floppy disc or the like has been made available. The foregoing apparatus is able to directly record an image signal on a disc or the like.

To display information in an image recording apparatus, such as the VCR/camcoder on the PC or to edit information by the PC, the capture board must be inserted into the PC or connected on the outside. Moreover, dedicated software must be installed. However, the capture board is costly apparatus.

When an analog capture board captures so-called digital video (hereinafter sometimes expressed as "DV")-standard video signal, digitized data must temporarily be converted into analog data. Therefore, there arises a problem in that the quality of the image deteriorates.

Also the apparatus having the functions including the titler operates a complicated input/control portion having menu keys and the like in place of the keyboard. Moreover, installed software is not satisfactory. Therefore, the title image cannot flexibly be processed.

SUMMARY OF THE INVENTION

According to one aspect of the present invention, there is provided a recording/reproducing apparatus including: image pickup means for generating a picked-image signal; first writing means for writing the picked-image signal on a first recording medium; reading means for reading an image signal from the first recording medium; second writing means for writing the image signal read by the reading means on a second recording medium; and control means for controlling recording/reproducing between the first and second recording mediums.

According to another aspect of the present invention, there is provided a recording/reproducing apparatus including: image pickup means for generating a picked-image signal; first writing means for writing the picked-image signal on a first recording medium; reading means for reading an image signal from the first recording medium; converting means for subjecting the signal read by the reading means to a predetermined conversion process; second writing means for writing the image signal supplied from the reading means and converted by the converting means on a second recording medium; and control means for controlling recording/reproducing between the first and second recording mediums.

According to another aspect of the present invention, there is provided a recording/reproducing apparatus incorporating first and second recording mediums, the recording/reproducing apparatus including: image pickup means for generating a picked-image signal; reading means for reading a signal recorded on the second recording medium; mixing means for mixing the signal read by the reading means with the picked-image signal; writing means for writing a mixed signal supplied from the mixing means on the first recording medium; and control means for controlling recording/reproducing between the first and second recording mediums.

According to another aspect of the present invention, there is provided a recording/reproducing apparatus incorporating first and second recording mediums, the recording/reproducing apparatus including: image pickup means for generating a picked-image signal; reading means for reading a signal recorded on the second recording medium; converting means for subjecting the signal read by the reading means to a predetermined conversion process; mixing means for mixing the signal read by the reading means and converted by the converting means with the picked-image signal with each other; writing means for writing a mixed signal supplied from the mixing means on the first recording medium; and control means for controlling recording/reproducing between the first and second recording mediums.

According to another aspect of the present invention, there is provided a recording/reproducing apparatus incorporating first and second recording mediums, the recording/reproducing apparatus including: image pickup means for generating a picked-image signal; first reading means for reading an image signal from the first recording medium; second reading means for reading a signal recorded on the second recording medium; mixing means for mixing the signal read by the second reading means with the picked-image signal with each other; first writing means for writing a mixed signal supplied from the mixing means on the first recording medium; second writing means for writing the image signal read by the first reading means on the second recording medium; and control means for controlling recording/reproducing between the first and second recording mediums.

According to another aspect of the present invention, there is provided a recording/reproducing apparatus incorporating first and second recording mediums, the recording/reproducing apparatus including: image pickup means for generating a picked-image signal; first reading means for reading an image signal from the first recording medium; second reading means for reading a signal recorded on the second recording medium; converting means for subjecting the signal read by the first reading means or the second reading means to a predetermined conversion process; mixing means for mixing the signal read by the second reading means and converted by the converting means with the picked-image signal with each other; first writing means for writing a mixed signal supplied from the mixing means on the first recording medium; second writing means for writing the image signal read by the first reading means and converted by the converting means on the second recording medium; and control means for controlling recording/reproducing between the first and second recording mediums.

According to another aspect of the present invention, there is provided a recording/reproducing method adaptable to an image pickup apparatus which has first and second recording mediums, the recording/reproducing method including: a first writing step for writing a picked-image signal on a first recording medium; a reading step for reading an image signal from the first recording medium; and a second writing step for writing the image signal read in the reading step on the second recording medium.

According to another aspect of the present invention, there is provided a recording/reproducing method adaptable to an image pickup apparatus which incorporates first and second recording mediums, the recording/reproducing method including: a first writing step for writing a picked-image signal on the first recording medium; a reading step for reading an image signal from the first recording medium; a converting step for subjecting the signal read in the reading step to a predetermined conversion process; and a second writing step for writing the image signal read by the reading means and converted in the converting step on the second recording medium.

According to another aspect of the present invention, there is provided a recording/reproducing method adaptable to an image pickup apparatus which incorporates first and second recording mediums, the recording/reproducing method including: a reading step for reading a signal recorded on the second recording medium; a mixing step for mixing the signal read in the reading step with a picked-image signal with each other; and a writing step for writing a signal mixed in the mixing step on the first recording medium.

According to another aspect of the present invention, there is provided a recording/reproducing method adaptable to an image pickup apparatus which incorporates first and second recording mediums, the recording/reproducing method including: a reading step for reading a signal recorded on the second recording medium; a converting step for subjecting the signal read in the reading step to a predetermined converting process; a mixing step for mixing the signal converted in the converting step with a picked-image signal; and a writing step for writing recording/reproducing apparatus signal mixed in the mixing step on the first recording medium.

According to another aspect of the present invention, there is provided a recording/reproducing method adaptable to an image pickup apparatus which incorporates first and second recording mediums, the recording/reproducing method including: a first reading step for reading an image signal from the first recording medium; a second reading step for reading a signal recorded on the recording medium; a mixing step for mixing the signal read in the second reading step with a picked-image signal; a first writing step for writing a signal mixed in the mixing step on the first recording medium; and a second writing step for writing the image signal read in the first reading step on the second recording medium.

According to another aspect of the present invention, there is provided a recording/reproducing method adaptable to an image pickup apparatus which incorporates first and second recording mediums, the recording/reproducing method including: a first reading step for reading an image signal from the first recording medium; a second reading step for reading a signal recorded on the second recording medium; a converting step for subjecting the signals read in the first and second reading steps to a predetermined conversion process; a mixing step for mixing the signal read in the second reading step and converted in the converting step with a picked-image signal; a first writing step for writing the signal mixed in the mixing step on the first recording medium; and a second writing step for writing the image signal read in the first reading step and converted in the converting step on the second recording medium.

Other objects, features and advantages of the invention will be evident from the following detailed description of the preferred embodiments described in conjunction with the attached drawings.

DESCRIPTION OF THE PREFERRED EMBODIMENTS

An embodiment of the present invention will now be described with reference to the drawings. In this embodiment, a camera-integrated video tape recorder (VTR), that is, a so-called camcoder will now be described. To explicitly describe the present invention, the optical portion including the camera is omitted from the following description. Therefore, only the electric circuit portions will now be described.

Figure 1:
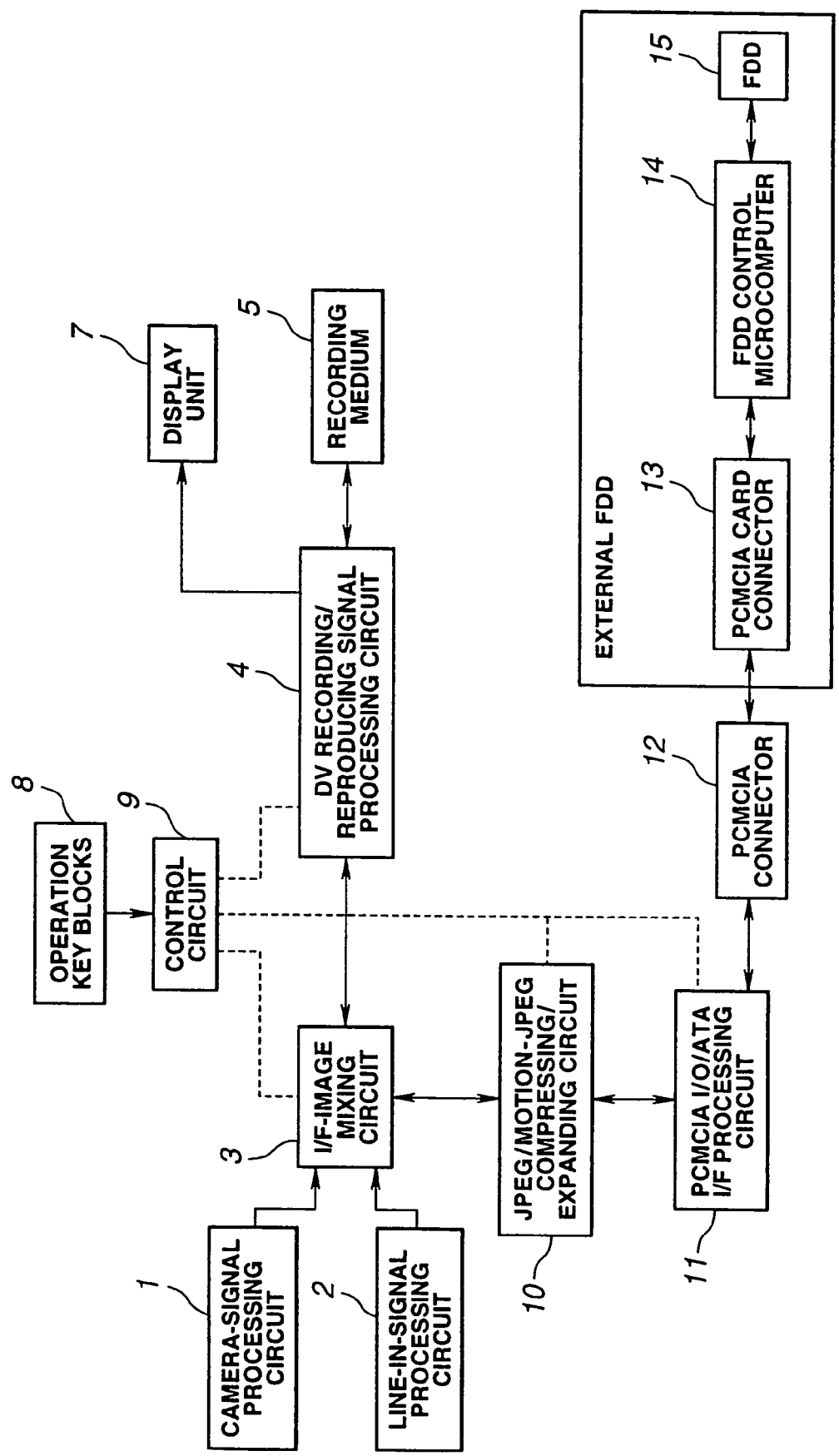
FIG. 1 is a block diagram showing the schematic structure of a camcoder according to the present invention.

The camcoder according to the present invention, as shown in FIG. 1, incorporates a camera-signal processing circuit 1 for processing a signal supplied from a camera (not shown); a line-in-signal processing circuit 2 for processing a line-in signal supplied from outside; and an I/F-image mixing circuit 3 for performing an interface process and an image mixing process of signals supplied from the camera-signal processing circuit 1 and the line-in-signal processing circuit 2.

The camera-signal processing circuit 1 subjects an image signal supplied from the camera (not shown) to predetermined processes. The line-in-signal processing circuit 2 subjects a line-in signal to predetermined processes.

The I/F-image mixing circuit 3 subjects signals supplied from the camera-signal processing circuit 1 and the line-in-signal processing circuit 2 to an interface process. The I/F-image mixing circuit 3 mixes the image with an image supplied from another circuit.

The camcoder incorporates a DV recording/reproducing signal processing circuit 4, a display unit 7 for displaying an information signal and a recording medium 5, such as a magnetic tape, for recording the information signal.

The DV recording/reproducing signal processing circuit 4 records/reproduces a so-called digital video (DV)-standard information signal.

The display unit 7 displays the information signal supplied from the DV recording/reproducing signal processing circuit 4. The display unit 7 may be, for example, a liquid crystal display (LCD).

The recording medium 5 is a medium on which the information signal supplied from the DV recording/reproducing signal processing circuit 4 is recorded. The information signal recorded on the recording medium 5 is reproduced by the DV recording/reproducing signal processing circuit 4. The recording medium 5 may be, for example, a magnetic tape structured such that an information signal is recorded as residual magnetization on a tape-shape medium.

Moreover, the camcoder according to this embodiment incorporates a JPEG (Joint Photographic Expert Group)/Motion-JPEG compressing/expanding circuit 10; a PCMCIA (Personal Computer Memory Card Internal Association input/output) I/O/ATA I/F (AT attachment interface) processing circuit 11; and a PCMCIA connector 12.

The PCMCIA standard is a standard defined by PCMCIA for an interface for a so-called PC card. The AT standard is a standard for establishing the connection between a PC/AT-convertible processor and hard disc drive.

The JPEG/Motion-JPEG compressing/expanding circuit 10 is a circuit for expanding a JPEG-standard still image or a coded Motion JPEG-standard dynamic image into an image signal or compressing an image signal of a still image or a dynamic image into the foregoing standard coded image. The JPEG/Motion-JPEG compressing/expanding circuit 10 subjects an image signal supplied from the I/F-image mixing circuit 3 or a coded image supplied from the PCMCIA I/O/ATA I/F processing circuit 11 to the above-mentioned processes.

The PCMCIA I/O/ATA I/F processing circuit 11 interfaces between the JPEG/Motion-JPEG compressing/expanding circuit 10 and an external floppy disc (FD) drive. Specifically, since the PCMCIA I/O/ATA I/F processing circuit 11 is adapted to the PCMCIA I/O standard or the ATA I/F standard to establish the connection with the external floppy disc drive (hereinafter sometimes expressed as "FDD"), conversion processes adaptable to the above-mentioned standards are performed.

The PCMCIA connector 12 is a PCMCIA-standard connector adaptable to a PCMCIA-standard connector of the external FDD.

The camcoder according to the present invention incorporates operation key blocks 8 and a control circuit 9 for controlling the elements of the recording/reproducing apparatus according to the present invention.

The operation key blocks 8 are operated to input information to the camcoder and composed of, for example, a menu dial, a photo-switch and mode switches.

The control circuit 9 is a circuit for controlling the elements of the recording/reproducing apparatus according to the present invention. The control circuit 9 comprises, for example, a microcontroller composed of a CPU, a RAM, a ROM and the like.

The external FDD incorporates a PCMCIA card connector 13, a FDD control microcomputer 14 and a FDD 15.

The PCMCIA card connector 13 is a PCMCIA-standard card connector. The FDD control microcomputer 14 is a control circuit for controlling transference of data to the FDD 15 and the operation of the FDD 15. The FDD control microcomputer 14 comprises, for example, a microcontroller.

The FDD 15 rotates a floppy disc to write/read data to and from tracks of the floppy disc.

In the recording/reproducing apparatus having the above-mentioned structure, the camera-signal processing circuit 1, line-in-signal processing circuit 2, I/F-image mixing circuit 3, DV recording/reproducing signal processing circuit 4, recording medium 5, display unit 7, operation key blocks 8, control circuit 9, JPEG/Motion-JPEG compressing/expanding circuit 10, PCMCIA I/O/ATA I/F processing circuit 11 and the PCMCIA connector 12 correspond to the DV camcoder.

As described above, the PCMCIA card connector 13, FDD control microcomputer 14 and the FDD 15 form the external FDD. In this embodiment, the camcoder portion and the external FDD are connected to each other through the PCMCIA-standard I/F. The connection is established through the PCMCIA connector 12 of the camcoder and the PCMCIA card connector 13 of the external FDD.

As a matter of course, a system may be employed which incorporates the FDD included in a DV camcoder.

When the PCMCIA I/F is used to perform communication with the FDD control microcomputer 14 of the external FDD to operate the FDD 15 so as to input/output data, the specification of the PCMCIA I/F is as follows: a left-half portion of each of Tables 1 to 4 shows pin configuration in the ATA I/F which is a memory-only card interface which can always be used when a card is inserted. A right-hand portion of each of Tables 1 to 4 shows pin configuration in the I/O interface which is an I/O memory card interface which can be used only when the card and a socket have been configured. As described above, the memory-only card interface and the I/O memory card interface are different from each other in the state of use of the pins.

In the tables, symbol "I" indicates input of a signal to the card and "O" indicates output of a signal from the card.

TABLE 1

| ATA I/F | | | | I/O I/F | | | |
|---|---|---|---|---|---|---|---|
| pin | signal | I/O$^2$ | function | pin | signal | I/O$^2$ | function |
| 1 | GND | DC | ground | 1 | GND | DC | ground |
| 2 | D3 | I/O | data bit 3 | 2 | D3 | I/O | data bit 3 |
| 3 | D4 | I/O | data bit 4 | 3 | D4 | I/O | data bit 4 |
| 4 | D5 | I/O | data bit 5 | 4 | D5 | I/O | data bit 5 |
| 5 | D6 | I/O | data bit 6 | 5 | D6 | I/O | data bit 6 |
| 6 | D7 | I/O | data bit 7 | 6 | D7 | I/O | data bit 7 |
| 7 | CE1# | I | card enable | 7 | CE1# | I | card enable |
| 8 | A10 | I | address bit 10 | 8 | A10 | I | address bit 10 |
| 9 | OE# | I | output enable | 9 | OE# | I | output enable |
| 10 | A11 | I | address bit 11 | 10 | A11 | I | address bit 11 |

TABLE 1-continued

| ATA I/F | | | | I/O I/F | | | |
|---|---|---|---|---|---|---|---|
| pin | signal | I/O[2] | function | pin | signal | I/O[2] | function |
| 11 | A9 | I | address bit 9 | 11 | A9 | I | address bit 9 |
| 12 | A8 | I | address bit 8 | 12 | A8 | I | address bit 8 |
| 13 | A13 | I | address bit 13 | 13 | A13 | I | address bit 13 |
| 14 | A14 | I | address bit 14 | 14 | A14 | I | address bit 14 |
| 15 | WE# | I | write enable | 15 | WE# | I | write enable |
| 16[1] | READY | O | ready | 16[1] | IREQ# | O | interrupt request |
| 17 | Vcc | DCin | supply voltage | 17 | Vcc | DCin | supply voltage |

TABLE 2

| ATA I/F | | | | I/O I/F | | | |
|---|---|---|---|---|---|---|---|
| pin | signal | I/O[2] | function | pin | signal | I/O[2] | function |
| 18[1] | Vpp1 | DCin | programming supply voltage 1 | 18[1] | GND | DCin | programming and peripheral supply 1 |
| 19 | A16 | I | address bit 16 | 19 | D3 | I | address bit 16 |
| 20 | A15 | I | address bit 15 | 20 | D4 | I | address bit 15 |
| 21 | A12 | I | address bit 12 | 21 | D5 | I | address bit 12 |
| 22 | A7 | I | address bit 7 | 22 | D6 | I | address bit 7 |
| 23 | A6 | I | address bit 6 | 23 | D7 | I | address bit 6 |
| 24 | A5 | I | address bit 5 | 24 | CE1# | I | address bit 5 |
| 25 | A4 | I | address bit 4 | 25 | A10 | I | address bit 4 |
| 26 | A3 | I | address bit 3 | 26 | OE# | I | address bit 3 |
| 27 | A2 | I | address bit 2 | 27 | A11 | I | address bit 2 |
| 28 | A1 | I | address bit 1 | 28 | A9 | I | address bit 1 |
| 29 | A0 | I | address bit 0 | 29 | A8 | I | address bit 0 |
| 30 | D0 | I/O | data bit 0 | 30 | A13 | I/O | data bit 0 |
| 31 | D1 | I/O | data bit 1 | 31 | A14 | I/O | data bit 1 |
| 32 | D2 | I/O | data bit 2 | 32 | WE# | I/O | data bit 2 |
| 33[1] | WIP | O | write protect | 33[1] | IREQ# | O | I/O port is 16 bit |
| 34 | GID | DC | ground | 34 | Vcc | DC | ground |

TABLE 3

| ATA I/F | | | | I/O I/F | | | |
|---|---|---|---|---|---|---|---|
| pin | signal | I/O[2] | function | pin | signal | I/O[2] | function |
| 35 | GND | DC | ground | 35 | GND | DC | ground |
| 36 | D3 | O | detection of card | 36 | D3 | O | detection of card |
| 37 | D4 | I/O | data bit 11 | 37 | D4 | I/O | data bit 11 |
| 38 | D5 | I/O | data bit 12 | 38 | D5 | I/O | data bit 12 |
| 39 | D6 | I/O | data bit 13 | 39 | D6 | I/O | data bit 13 |
| 40 | D7 | I/O | data bit 14 | 40 | D7 | I/O | data bit 14 |
| 41 | CE1# | I/O | data bit 15 | 41 | CE1# | I | data bit 15 |
| 42 | A10 | I | card enable | 42 | A10 | I | card enable |
| 43[4] | OE# | O | voltage detection 1 | 43[4] | OE# | O | voltage detection 1 |
| 44[1] | A11 | | reservation | 44[1] | A11 | I | I/O read |
| 45[1] | A9 | | reservation | 45[1] | A9 | I | I/O write |
| 46 | A8 | I | address bit 17 | 46 | A8 | I | address bit 17 |
| 47 | A13 | I | address bit 18 | 47 | A13 | I | address bit 18 |
| 48 | A14 | I | address bit 19 | 48 | A14 | I | address bit 19 |
| 49 | WE# | I | address bit 20 | 49 | WE# | I | address bit 20 |
| 50 | READY | I | address bit 21 | 50 | IREQ# | I | address bit 21 |
| 51 | Vcc | DCin | supply voltage | 51 | Vcc | DCin | supply voltage |

TABLE 4

| ATA I/F | | | | I/O I/F | | | |
|---|---|---|---|---|---|---|---|
| pin | signal | I/O[2] | function | pin | signal | I/O[2] | function |
| 52[1] | Vpp1 | DCin | programming supply voltage 1 | 12[1] | GND | DCin | programming and peripheral supply 1 |
| 53 | A16 | I | address bit 22 | 53 | D3 | I | address bit 22 |
| 54 | A15 | I | address bit 23 | 54 | D4 | I | address bit 23 |
| 55 | A12 | I | address bit 24 | 55 | D5 | I | address bit 24 |
| 56 | A7 | I | address bit 25 | 56 | D6 | I | address bit 25 |
| 57[5] | A6 | O | voltage detection 2 | 57 | D7 | I | voltage detection 2 |
| 58[3] | A5 | I | card reset | 58 | CE1# | I | card reset |
| 59[3] | A4 | O | extension of bus cycle | 59 | A10 | O | extension of bus cycle |
| 60[1] | A3 | | reservation | 60[1] | OE# | O | response of input port |
| 61[1] | A2 | I | selection | 61[1] | A11 | I | selection of register and I/O enable |
| 62[1] | A1 | O | battery voltage detection 2 | 62[1] | A9 | O | audio digital waveform |
| 63[1] | A0 | O | battery voltage detection 1 | 63[1] | A8 | O | card status change |
| 64 | D0 | I/O | data bit 8 | 64 | A13 | I/O | data bit 8 |
| 65 | D1 | I/O | data bit 9 | 65 | A14 | I/O | data bit 9 |
| 66 | D2 | I/O | data bit 10 | 66 | WE# | I/O | data bit 10 |
| 67 | WIP | O | detection of card | 67 | IREQ# | O | detection of card |
| 68 | GID | DC | ground | 68 | Vcc | DC | ground |

The difference between the ATA I/F and the I/O I/F is the difference in the number of control lines. That is, the difference is only the difference between the control specification of the FD control circuit and the control circuit 9. Therefore, an operation is permitted in either I/F. Since the ATA I/F has lesser ground lines, control of the control circuit 9 of the main body and that of the FDD control microcomputer 14 of the external FDD are complicated control.

The overall system will now be described by following a flow of a signal in the recording/reproducing apparatus.

The camera-signal processing circuit 1 processes a camera signal, while the line-in-signal processing circuit 2 processes a line-in signal. The I/F-image mixing circuit 3 interfaces and mixes signals supplied from the camera-signal processing circuit 1 and the line-in-signal processing circuit 2. The DV recording/reproducing signal processing circuit 4 records/reproduces a signal to and from the recording medium 5 and records a signal to and from the FD in the FDD 15 through the JPEG/Motion-JPEG compressing/expanding circuit 10. Specifically, the DV recording/reproducing signal processing circuit 4 communicates data and/or mixes the signals so as to record the signal on the FD.

When a signal from a camera or a line-in signal is recorded on a tape, a signal subjected to the DV signal process in the DV recording/reproducing signal processing circuit 4 is usually recorded on the recording medium. When a signal from the camera or a line-in signal is recorded on the FD, the JPEG/Motion-JPEG compressing/expanding circuit 10 performs a compressing process. In this case, a still image is compressed by the JPEG method and a dynamic image is compressed by the Motion JPEG method. Then, the PCMCIA I/O/ATA I/F processing circuit 11 performs PCMCIA I/O process or an ATA interface process. Data is supplied to the external FDD through the PCMCIA connector 12 and the PCMCIA card connector 13. While handshakes with the control circuit 9 and the FDD control microcomputer 14 are being performed, data is recorded on the FD.

A flow of a signal which is performed when an image or the like recorded on a recording medium 5, such as a tape, is downloaded on a floppy disc will now be described.

Data recorded on the recording medium 5, such as a tape, is recorded on the FD to follow the operation of the keys of the operation key blocks 8 and the control performed by the control circuit 9. The foregoing control will be described later with reference to a flow chart.

A signal reproduced from the recording medium 5 is subjected to the DV reproducing process in the DV recording/reproducing signal processing circuit 4 so as to be restored to an NTSC or PAL television signal. The I/F-image mixing circuit 3 performs the interface process so that the television signal is converted in accordance with the VGA (Video Graphics Array) or the like for the personal computer (PC).

As a matter of course, the signal from the camera or the line-in signal and the reproduced signal may be mixed with each other. The image signal supplied from the I/F-image mixing circuit 3 is compressed by the JPEG/Motion-JPEG compressing/expanding circuit 10 so as to be transferred to the external FDD through the PCMCIA connector 12 and the PCMCIA card connector 13. That is, the FDD 15 records the compressed image signal on the FDD 15 while handshakes with the control circuit 9 and the FDD control microcomputer 14 of the external FDD are being performed.

A process for recording a title, a frame or an edited image processed by the PC or the like on a tape or the like will now be described in accordance with a flow of a signal.

A floppy disc on which a title, frames or an edited image processed by a PC or the like (not shown) has been recorded, is inserted into the FDD 15. The FD is controlled by the control circuit 9 and the FDD control microcomputer 14 of the external FDD. That is, under the foregoing control, the signal is transferred to the JPEG/Motion-JPEG compressing/expanding circuit 10 and the PCMCIA I/O/ATA I/F processing circuit 11 through the PCMCIA connector 12 and the PCMCIA card connector 13. Then, the I/F-image mixing circuit 3 mixes the foregoing signal with signals supplied from the camera-signal processing circuit 1 and the line-in-signal processing circuit 2. Then, the mixed signal is processed by the DV recording/reproducing signal processing circuit 4, and then recorded on the recording medium 5, such as a tape.

A monitor image is displayed on the display unit 7 when upload/download is performed between the recording medium 5, such as a tape, and the FD or when a camera signal or a line-in signal is recorded. Thus, states of the foregoing operations are visually displayed.

Another example of the structure of this embodiment of the present invention will now be described in which data is recorded on a FD in the DV compressing format which is the same as that to which the recording medium, such as a tape, is adapted. To simply describe the structure, the elements of this example which are the same as those of the structure shown in FIG. 1 are given the same reference numerals. The same elements are omitted from detailed description.

Figure 2:
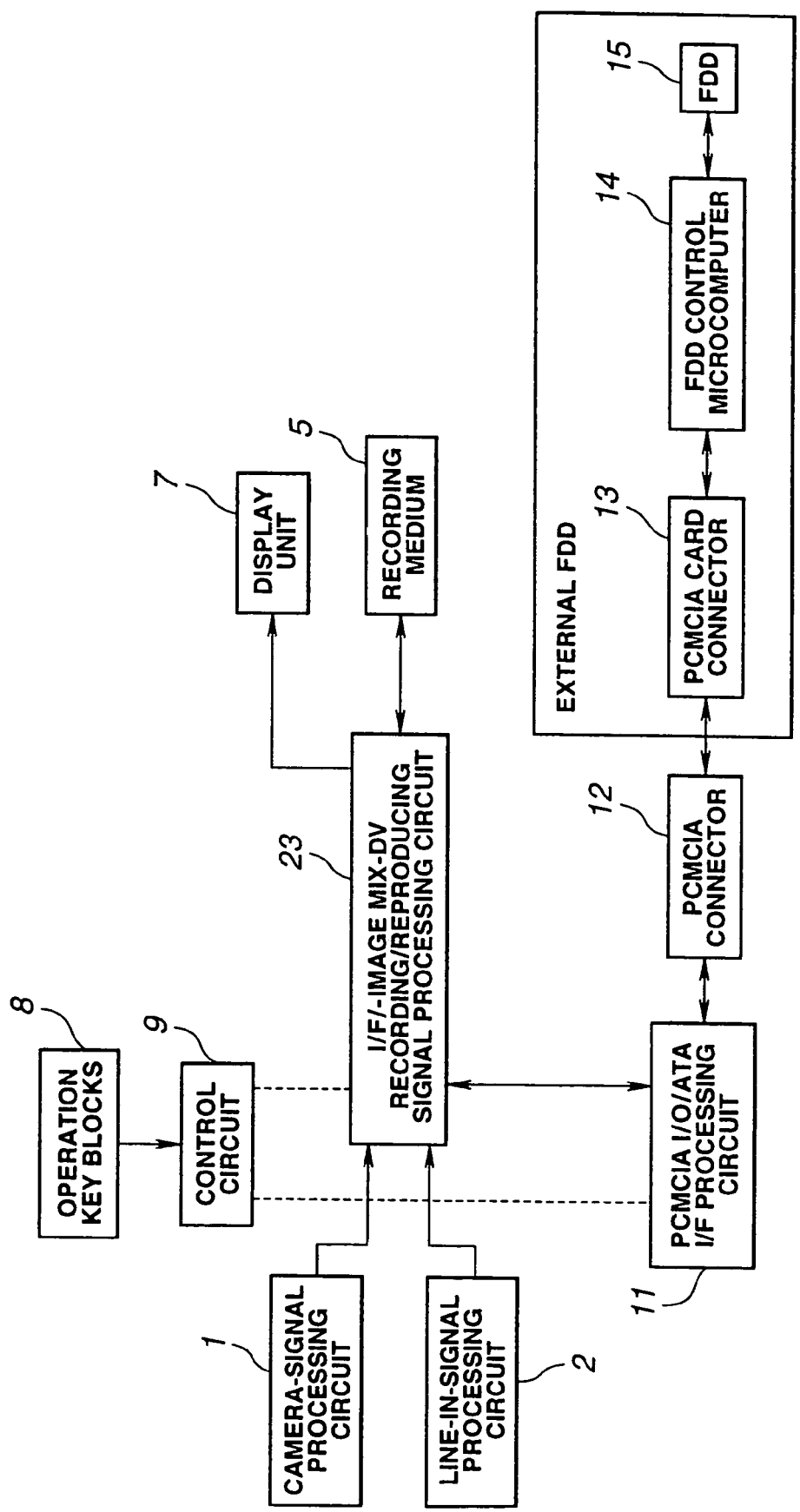
FIG. 2 is a block diagram showing the schematic structure of a camcoder for recording information on a floppy disc (hereinafter expressed as "FD") by DV compression.

In this example, the DV compressing format similar to that for the recording medium 5, such as a tape, is employed to record data on the FD, as shown in FIG. 2. Therefore, the JPEG/Motion-JPEG compressing/expanding circuit 10 shown in FIG. 1 is not provided for the structure of this example.

The I/F-image mixing circuit 3 and the DV recording/reproducing signal processing circuit 4 shown in FIG. 1 are integrated into an I/F/-image mix-DV recording/reproducing signal processing circuit 23.

Data is directly communicated between the I/F/-image mix-DV recording/reproducing signal processing circuit 23 and the PCMCIA I/O/ATA I/F processing circuit 11.

A process for collectively downloading data in the recording medium 5, such as a tape, will now be described. The sharing of the menu and the photo button which is performed when the collective downloading is performed will be described with reference to a flow chart shown in FIG. 5.

Index information on the DV format will now be described.

Figure 3:
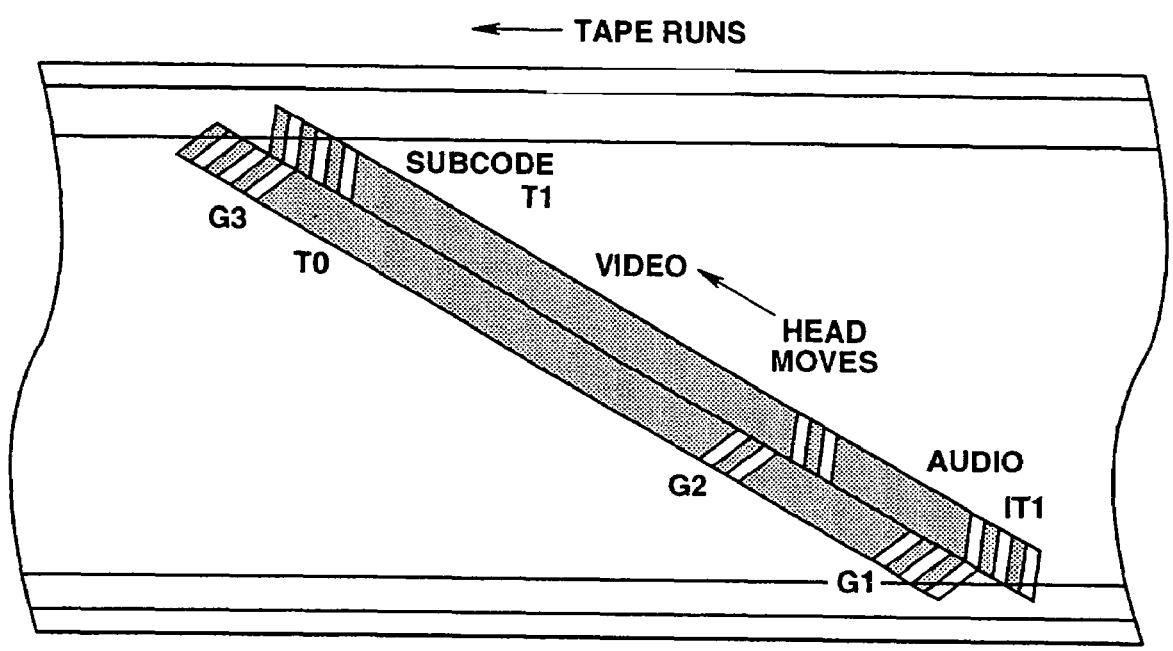
FIG. 3 is a diagram showing the structure of a pattern of a recording track.

The DV format enables a variety of indexes to be added to the subcode portions on the recording track pattern shown in FIG. 3.

The recording track pattern shown in FIG. 3 contains ITI (Insert and Track Information), AUDIO, VIDEO and SUBCODE sectors formed sequentially in the head movement direction. ITI includes a reference signal for the accuracy of clocks for after-recording AUDIO, VIDEO and SUBCODE. Gaps G1 to G3 are formed among sectors to prevent deterioration in the signals in each sector caused from deviation. The gaps G1 to G3 are enlarged in proportion to the distance from ITI to prevent jitters and to eliminate an influence of a skew of the tape.

Figure 4:
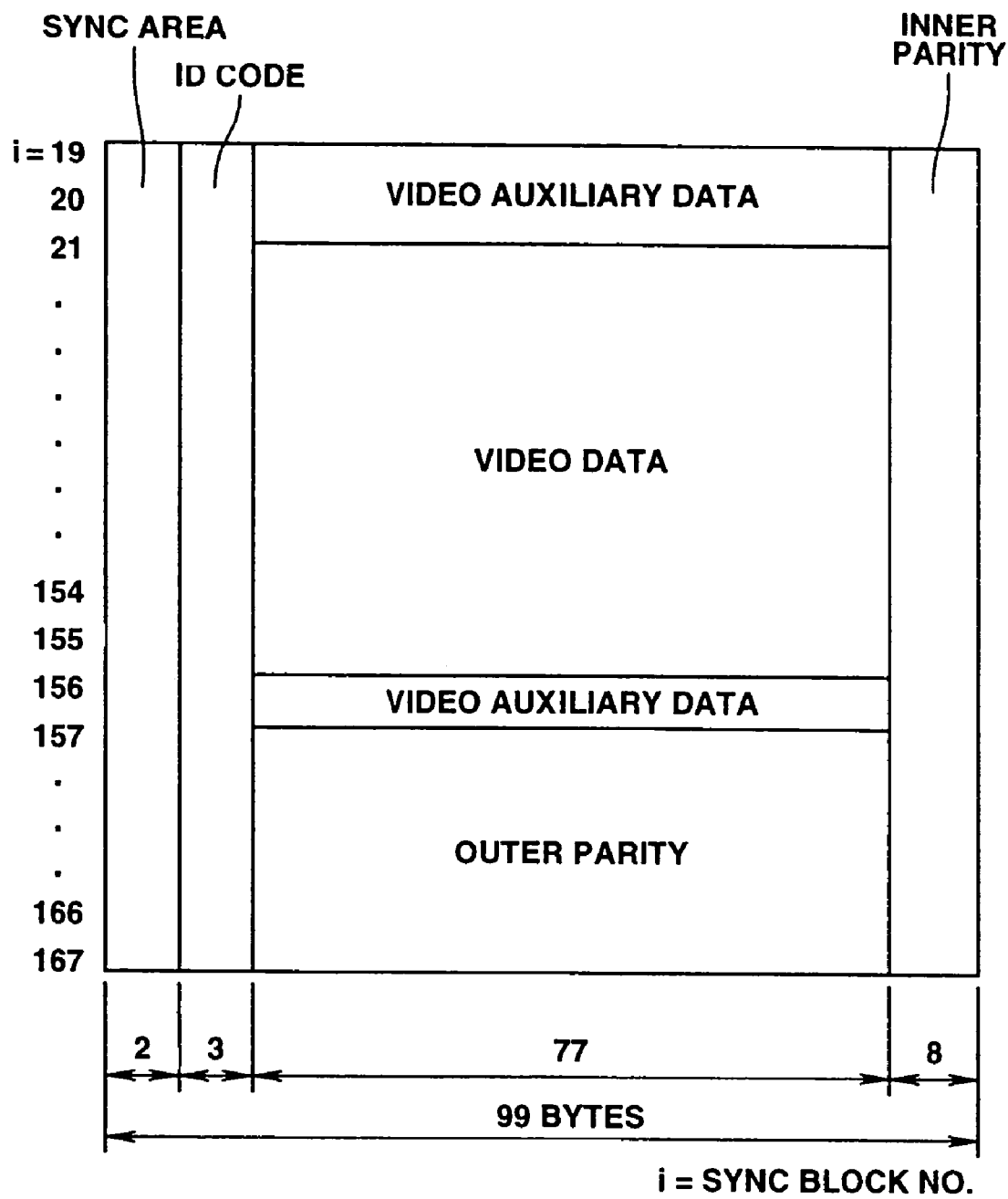
FIG. 4 is a diagram showing the data structure of a video area in the recording track.

FIG. 4 shows a structure obtained by decomposing a central video area on the recording pattern shown in FIG. 3 from a viewpoint of data. A Video Auxiliary data portion shown in FIG. 4 is a portion in which a photoindex of a still image is automatically added when the still image is recorded.

The Video and Auxiliary data portions in sync blocks having sync block Nos. 19, 20 and 156.

Figure 5:
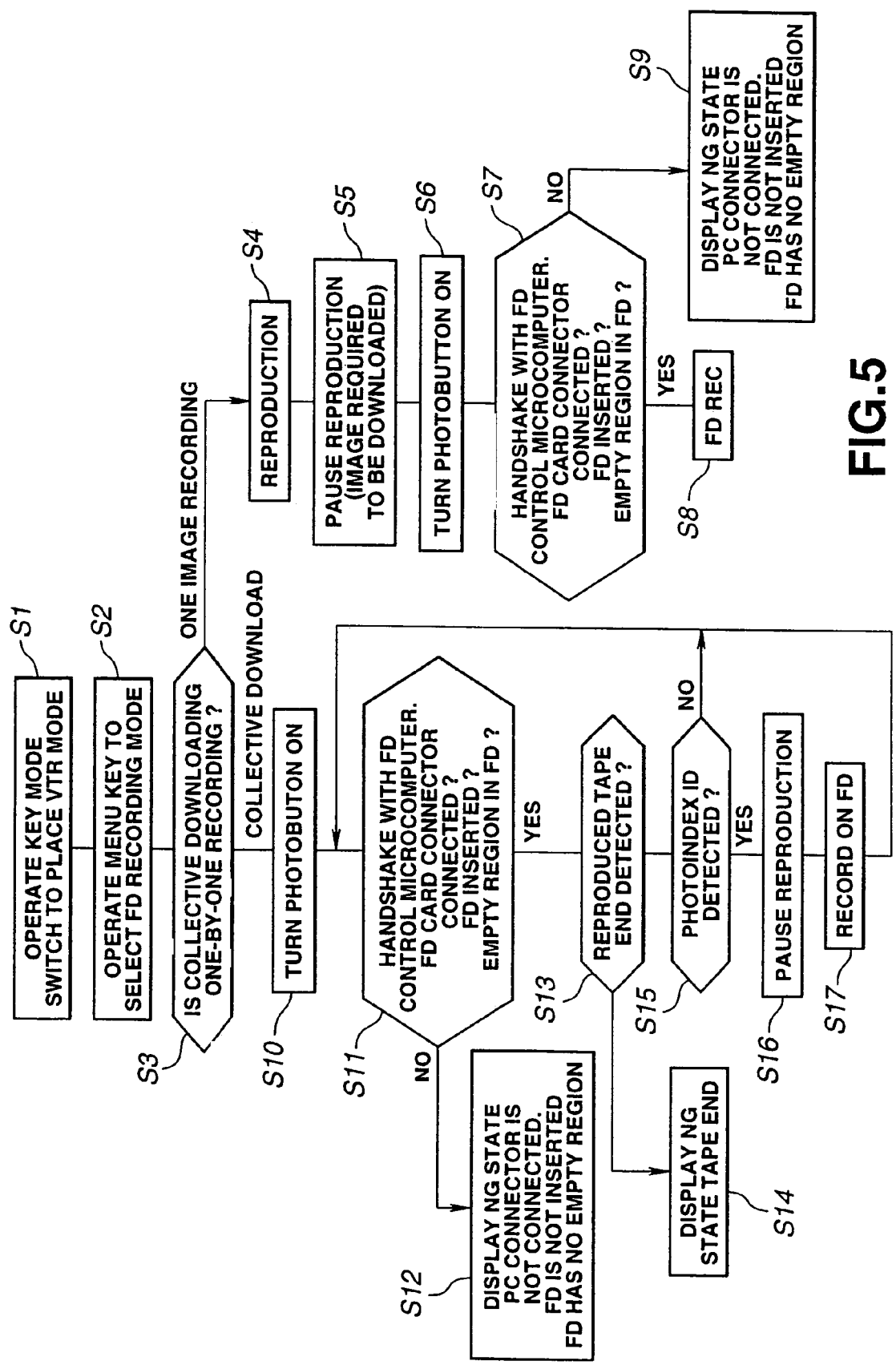
FIG. 5 is a flow chart showing sequential steps of a recording/reproducing method.

A process for detecting index information above to download the same on the FD will now be described with reference to a flow chart shown in FIG. 5.

Figure 6:
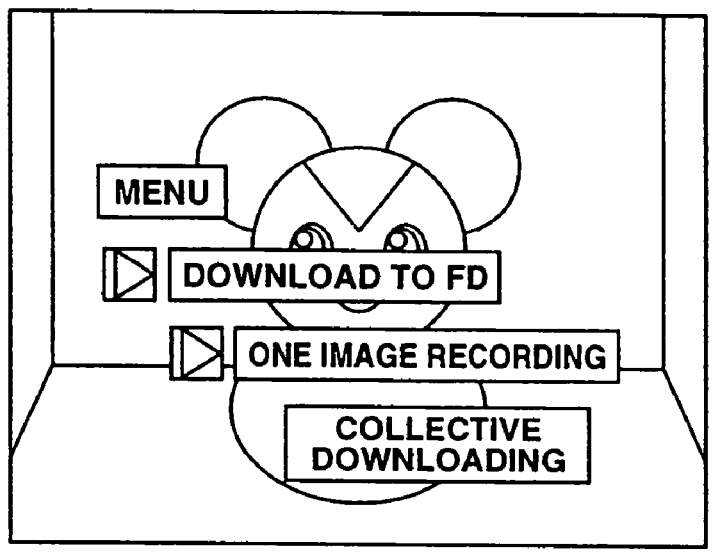
FIG. 6 is a diagram showing a menu screen of a display unit.

In step S1 the operation key mode switch is operated to place the VTR reproducing mode. In step S2 the FD recording mode is selected by using the menu key. In step S3 whether download is collectively downloading or recording of one image is selected. At this time, a menu as shown in FIG. 6 is displayed on the display unit 7.

That is, an entry "FD DOWNLOAD" is selected from the menu displayed on the display unit 7. Moreover, lower entries "RECORDING OF ONE IMAGE" and "COLLECTIVE DOWNLOAD" are displayed so as to be selected.

When one-image recording has been selected in step S3, the VTR PB (Play Back) key among the operation keys is, in step S4, depressed to reproduce the image from the VTR. In step S5 reproduction is paused at the timing of an image required to be downloaded. In step S6 the photobutton is depressed to record the image. Also the foregoing button is operated when the collective downloading is performed.

After the photobutton has been depressed, the control circuit 9 performs a handshake with the FDD control microcomputer 14 to determine in step S7 whether or not the FD card connector has been connected, whether or not a FD has been inserted and whether or not the FD has an empty region. If a negative determination is made, no-good state is displayed in step S9. The display of the no-good state on the display unit 7 is, for example, as shown in FIG. 7.

Figure 7:
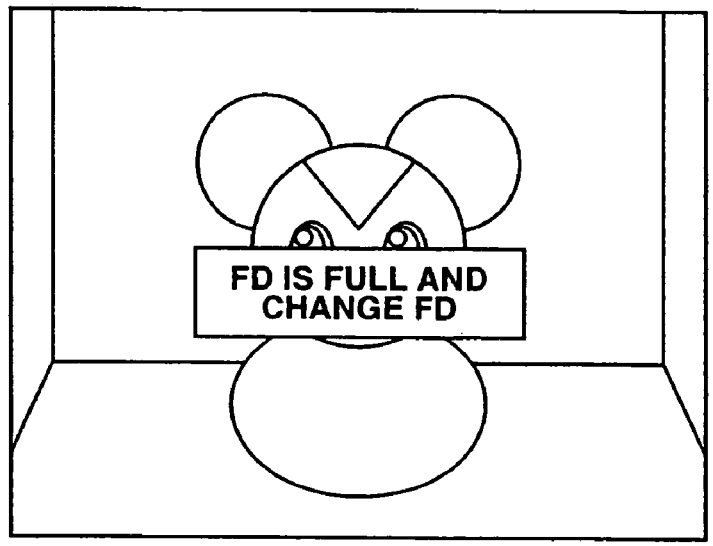
FIG. 7 is a diagram showing the menu screen on which no-good state is displayed.

FIG. 7 shows a message "FD is full and change FD" displayed in the central portion of the displayed screen as an example of display of the no-good state.

If an affirmative determination is made in step S7, the operation key blocks 8 are used to record one image on the FD.

When collective downloading is performed, collective downloading is selected from the menu in step S3. Then, the photobutton arranged to be operated in also collective downloading is depressed in step S10. In step S11 the same handshake as that in step S7 is performed with the microcontroller for controlling the FD and the like. If a negative determination is made, the process for displaying the no-good state is performed in step S12 similarly to step S9.

If an affirmative determination is made as a result of the handshake performed in step S11, a process for detecting a photoindex is performed in step S15 such that the photoindex and the index of a dynamic image are detected. If a determination is made in step S16 that the image is a still image, the reproduction is paused. If the image is a dynamic image, the image is as it is displayed so as to be recorded on the FD in step S17. The above-mentioned sequential operations are performed until the FD is filled with data or the tape end is detected. That is, the operation returns to step S11 in which whether or not the FD has an empty region is determined, step S13 in which the tape end is detected, step S15 in which the photoindex is detected. Thus, recording is repeated. If the FD, which has been filled with data, is changed to a new FD, whether or not the new FD has an empty region is again determined. If the new FD has an empty region, recording is restarted.

The operation for inputting start of the operation for downloading the contents recorded on the recording medium to the FD may be an operation similar to the operation of the photo-recording button.

In the above-mentioned embodiment of the present invention, the camcoder for recording a dynamic image on the medium, such as a video tape or a floppy disc, is enabled to download a still image on a floppy disc by using the PCMCIA I/F. Moreover, the embodiment of the present invention is structured to be capable of uploading a title, a frame or an edited image from a FD. The recording/reproducing apparatus according to the present invention is able to record/reproduce information through first and second recording mediums. A picked-image signal generated by an image pickup means can be recorded/reproduced through the first recording medium. An picked-image signal generated by the image pickup means can be recorded/reproduced as a still image through the second recording medium.

A specific structure of the camcoder according to the present invention and arranged to record/reproduce information through the first and second recording mediums will now be described.

Figure 8:
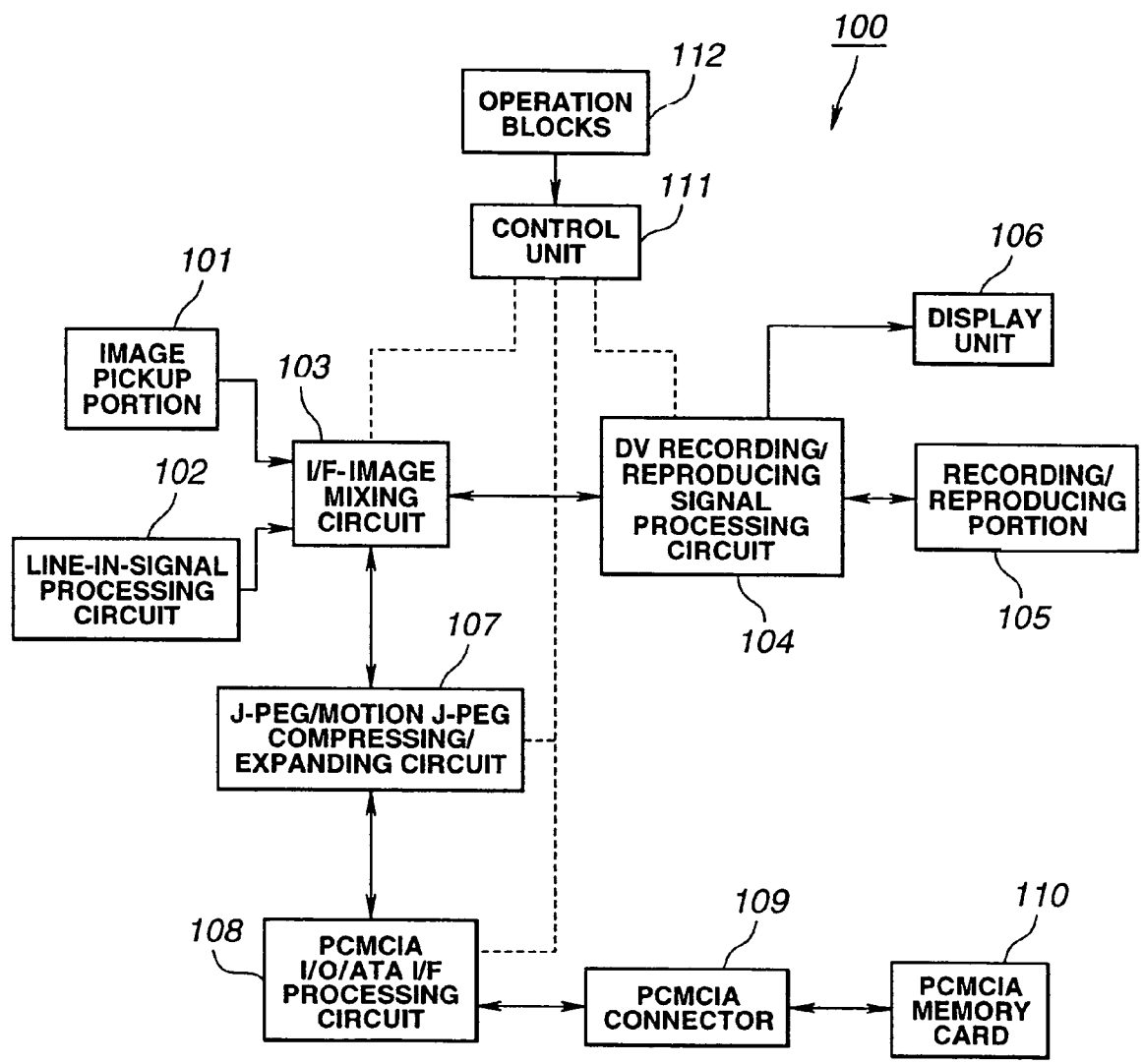
FIG. 8 is a block diagram showing the structure of the camcoder according to the present invention.

A camcoder 100 shown in FIG. 8 incorporates an I/F-image mixing circuit 103 to which an image signal is supplied from an image pickup portion 101 or a line-in-signal processing circuit 102; a recording/reproducing portion 105 and a display unit 106 connected to the I/F-image mixing circuit 103 through a DV recording/reproducing signal processing circuit 104; a I/F processing circuit 108 connected to the I/F-image mixing circuit 103 through a compressing/expanding circuit 107; a PCMCIA memory card 110 detachably connected to the I/F processing circuit 108 through a PCMCIA (Personal Computer Memory Card International Association) connector 109; a control unit 111 for controlling the foregoing units; and operation blocks 112 connected to the control unit 111.

Figure 9:
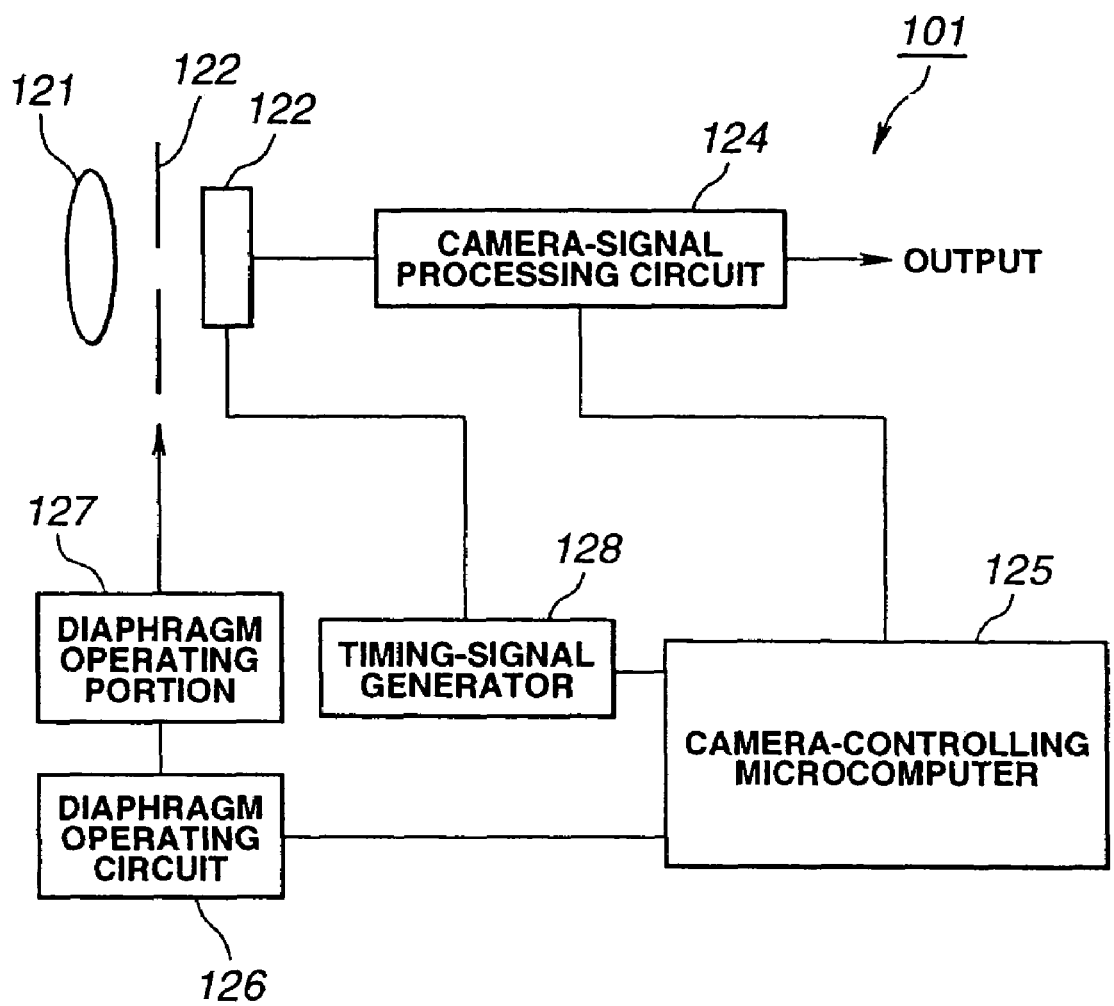
FIG. 9 is a block diagram showing the schematic structure of an image pickup portion of the camcoder.

As shown in FIG. 9 which shows the schematic structure of the image pickup portion 101, the image pickup portion 101 incorporates a CCD image sensor 123 on which a light beam of a picked image supplied from an image pickup lens 121 through a diaphragm 122 is made incident. A picked-image signal which is obtained by the CCD image sensor 123 as an output of the picked image is output through a camera-signal processing circuit 124.

The diaphragm 122 is operated by a diaphragm operating portion 127 connected to a diaphragm operating circuit 126 to which a diaphragm signal is supplied from a camera-controlling microcomputer 125.

The CCD image sensor 123 is operated when a variety of timing signals including a sensor gate signal and a transfer clock and supplied from a timing-signal generator 128 has been supplied.

The operation modes of the camera-signal processing circuit 124 and the timing-signal generator 128 are switched in response to control signals supplied from the camera-controlling microcomputer 125.

Figure 10:
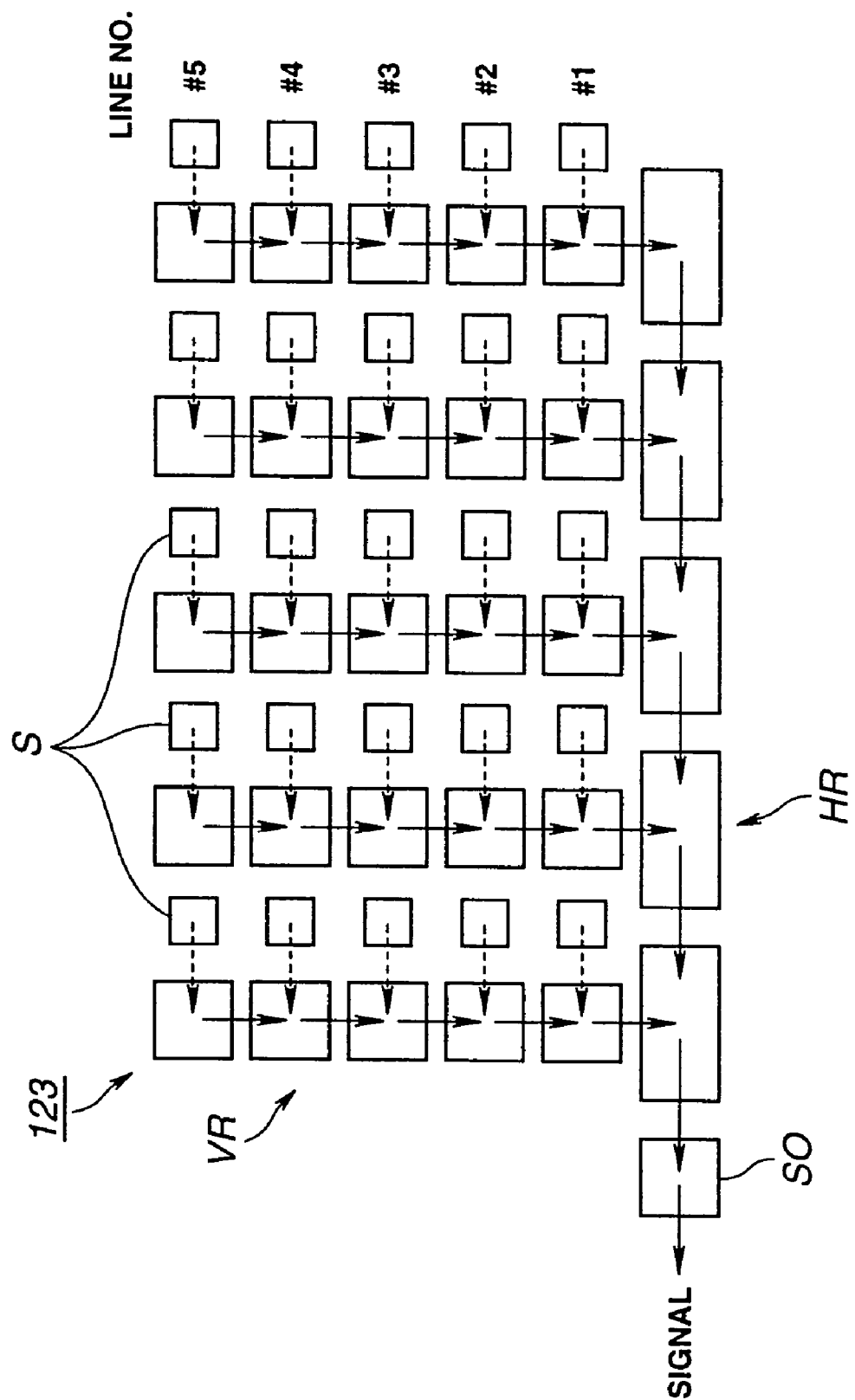
FIG. 10 is a plan view schematically showing the structure of CCD image sensors in the image pickup portion.

The CCD image sensor 123 having a structure schematically shown in FIG. 10 incorporates photosensors S disposed on a matrix corresponding to pixels; vertical transfer registers VR to each of which a read electric charge of a picked image of each pixel obtainable from each of the photosensors S is supplied; and a horizontal transfer register HR to which the electric charge of the picked image of each pixel for each horizontal line is transferred through the vertical transfer registers VR. The electric charge of a picked image of each pixel for each horizontal line is output from the horizontal transfer register HR through an output portion SO. In principle, the CCD image sensor 123 is a CCD imager which reads all pixels. The number of vertical transfer registers VR of the CCD image sensors 123 are the same as the number of pixels on the horizontal line. Each of the vertical transfer registers VR has transfer stages, the number of which is the same as the number of all pixels on a vertical line.

Figure 11:
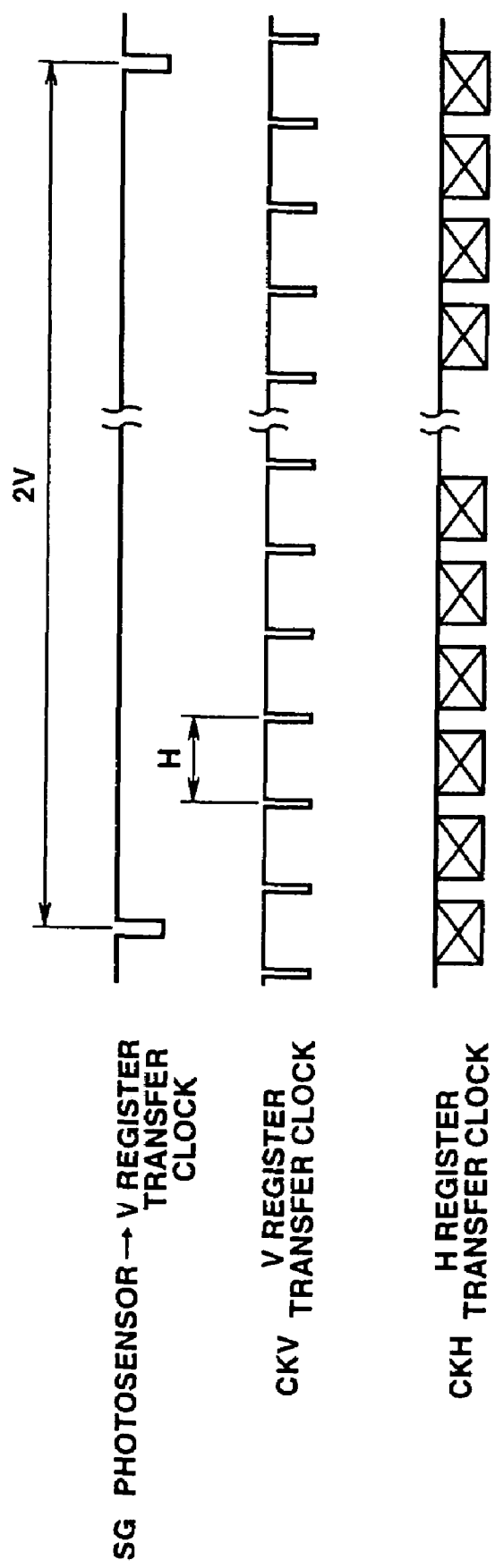
FIG. 11 is a time chart of the operation of the CCD image sensor in an all-pixel reading mode.

The mode for reading all pixels is placed in response to a control signal supplied from the camera-controlling microcomputer 125. In the foregoing case, the timing-signal generator 128 generates sensor gate signals SG, the period of which is 2 fields (2V), that is, one, frame (1F) and vertical clocks CVK, the period of which is one horizontal scan (1H). Moreover, the timing-signal generator 128 generates horizontal transfer clocks CKH having a frequency which corresponds to the number of pixels on the horizontal line, as shown in FIG. 11. Thus, the timing-signal generator 128 operates the CCD image sensor 123 in the mode for reading all pixels.

In the mode for reading all pixels, an electric charge of a picked image of each pixel obtained from each of photosensors S of the CCD image sensor 123 is read every other fields, that is, in each frame period (1F) by sensor-gate signal SG. Moreover, electric charges of picked images of all pixels read and supplied to the vertical transfer register VR for each horizontal line are transferred to the horizontal transfer register HR in each horizontal scanning period (1H). Thus, the electric charge of the picked image of each pixel for each horizontal line is, as a picked-image signal, output from the horizontal transfer register HR through the output portion SO. As a result, a picked-image signal can be obtained as a progress scan signal denoting the electric charges of the picked images of all pixels.

Figure 12:
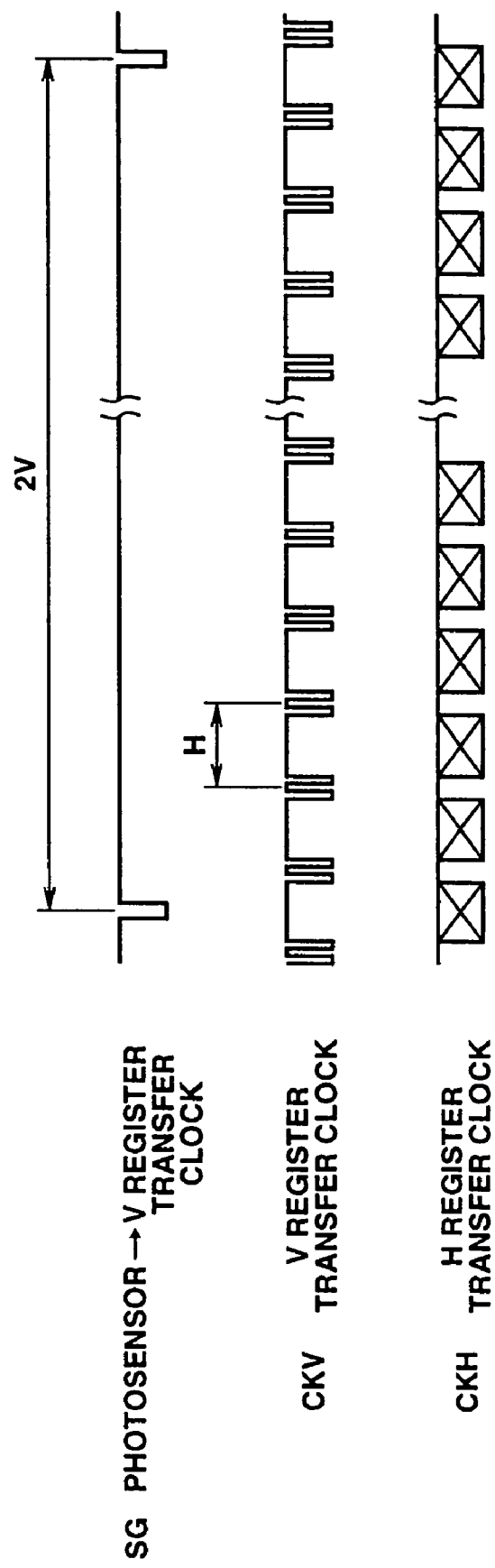
FIG. 12 is a time chart showing the operation of the CCD image sensor in an interlace reading mode.

When an interlace reading mode is placed in response to a control signal supplied from the camera-controlling microcomputer 125, the timing-signal generator 128 generates a sensor gate signals SG, the period of which is one field (1V), two successive vertical transfer clocks CKV, the period of which is one horizontal scanning period (1H) and horizontal transfer clock CKH having a frequency corresponding to the number of pixels on the horizontal line, as shown in FIG. 12. Thus, the CCD image sensor 123 is operated in the interlace reading mode.

In the interlace reading mode, an electric charge of a picked image of each pixel obtained from each of the photosensors S of the CCD image sensor 123 for each one field period (1V) and supplied to the vertical transfer register VR in response to the sensor gate signal SG. Then, electric charges of the picked images of all pixels for two horizontal lines read and supplied to the vertical transfer register VR are transferred to the horizontal transfer register HR in each horizontal scanning period (1H). Then, charges for two pixels adjacent to each other on the vertical line are added in the horizontal transfer register HR. As a result, the electric charge of the picked image of each of pixels of the horizontal lines, the number of which has been halved, is output from the horizontal transfer register HR as a picked-image signal through the output portion SO. Thus, a picked-image signal can be obtained from the electric charge of the picked images of all pixels as an interlace signal. Note that the combinations of electric charges for two pixels adjacent to each other on the vertical line which are added in the horizontal transfer register HR must be different from each other between odd-number fields and even-number fields.

In the camcoder 100, the I/F-image mixing circuit 103 interfaces the signals input from the image pickup portion 101 and the line-in-signal processing circuit 102 and mixes the signals with each other. The DV recording/reproducing signal processing circuit 104 subjects the digital video (DV)-standard information signal to a process for performing recording/reproducing. Then, the recording/reproducing portion 105 records the information signal supplied from the DV recording/reproducing signal processing circuit 104 on the recording medium. Moreover, the recording/reproducing portion 105 reproduces the information signal from the recording medium to supply the information signal to the DV recording/reproducing signal processing circuit 4. As the foregoing magnetic recording medium, a magnetic tape is employed on which the information signal is recorded as residual magnetization on a medium, such as a tape.

The display unit 106 displays the information signal which is recorded/reproduced through the DV recording/reproducing signal processing circuit 104.

The compressing/expanding circuit 107 is a circuit for expanding a JPEG (Joint Photographic Expert Group)-standard still image or a coded Motion JPEG standard dynamic image into an image signal or compressing an image signal of a still image or a dynamic image into the foregoing standard coded image. The compressing/expanding circuit 107 subjects the image signal or the coded image supplied from the I/F-image mixing circuit 103 or the PCMCIA I/O ATA I/F processing circuit 108 to the above-mentioned processes.

The PCMCIA I/O ATA I/F processing circuit 108 is a circuit for interfacing between the compressing/expanding circuit 107 and the PCMCIA memory card 110. The PCMCIA connector 109 is a PCMCIA-standard connector.

Figure 13:
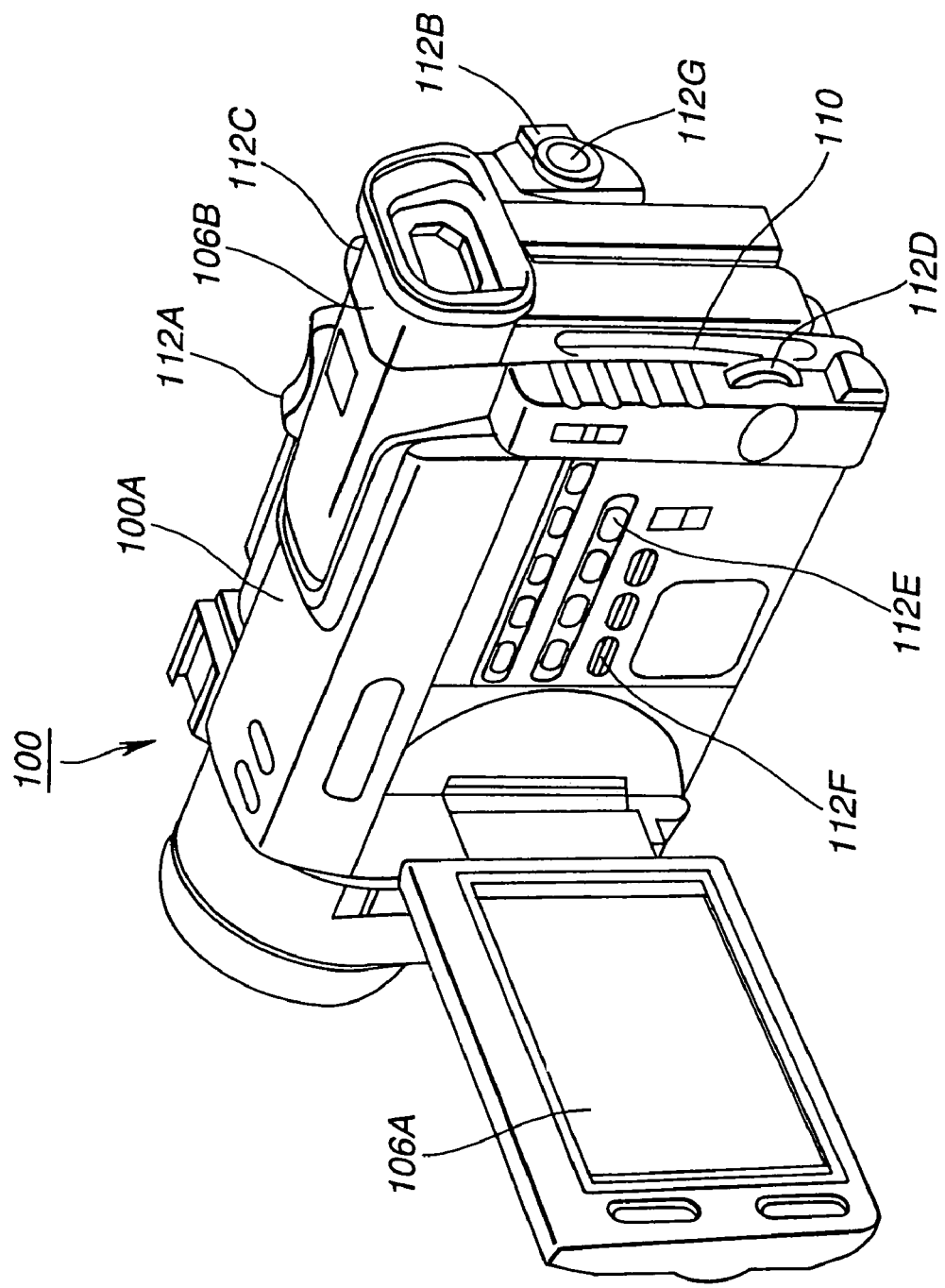
FIG. 13 is a perspective view showing the shape of the camcoder.

As shown in FIG. 13 which is a perspective view showing the shape of a camera body 100A, the camcoder 100 has an electronic view finder 6A and a liquid crystal display panel 6B serving as the display portion 6 and provided for the camera body 100A thereof. Moreover, a variety of setting buttons, such as a zoom operation lever 112A, an operation-mode switch lever 112B, a still-image photographing button 112C, a control dial 112D, a menu button 112E and data code button 112F, are provided for the camera body 100A to serve as the operation blocks 112.

The zoom operation lever 112A supplies, to the control unit 111, zoom operation input data corresponding to the operation position thereof. The control unit 111 controls the zoom operation portion for the image pickup lens 121 of the image pickup portion 101 to correspond to zoom operation input data.

Figure 14:
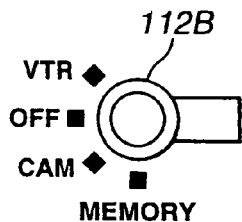
FIG. 14 is a diagram showing the switch positions of the operation-mode switch lever provided for the camcoder.

As shown in FIG. 14, the operation-mode switch lever 112B has four mode setting positions below:

Position 1: VTR
Position 2: OFF
Position 3: CAM
Position 4: MEMORY

Thus, operation input data corresponding to the position is supplied to the control unit 111. The still-image photographing button 112C is depressed in two steps to supply, to the control unit 111, operation input data corresponding to the first-step depression position and the second-step depression position. In accordance with operation input data, the control unit 111 controls the image pickup portion 101, I/F-image mixing circuit 103, DV recording/reproducing signal processing circuit 104, recording/reproducing portion 105, compressing/expanding circuit 107 and the I/F processing circuit 108 as follows.

Table 5 shows the relationship between states of operation modes placed by the operation-mode switch lever 112B and modes for recording a still image placed by the operation for depressing the still-image photographing button 112C.

TABLE 5

| Position of | | Button for Photographing Still Image | |
|---|---|---|---|
| Operation Mode Switch Lever | Start/Stop Button | Depression of One Step | Depression of Two Step |
| VTR | | Freeze | Recording of Still Image on in Memory |

TABLE 5-continued

| Position of | | Button for Photographing Still Image | |
|---|---|---|---|
| Operation Mode Switch Lever | Start/Stop Button | Depression of One Step | Depression of Two Step |
| Off | | | |
| CAM | Image of Camera is recorded on Tape | Freeze | Still Image is Recorded on Tape |
| Memory | | Freeze | Still Image is Recorded on Memory |

In the camcoder 100, the control unit 111 places the camcoder 100 in the VTR mode when the operation-mode switch lever 112B is at Position 1. In the VTR mode, the control unit 111 recognizes operation input of a VTR operation button (not shown) to control the recording/reproducing portion 105 in accordance with the operation input. If the reproduction button is operated, the control unit 111 causes the recording/reproducing portion 105 to start the reproducing operation.

When the operation-mode switch lever 112B is at Position 2, the control unit 111 brings the camcoder 100 to an operation interruption state.

When the operation-mode switch lever 112B is at Position 3, the control unit 111 places the camcoder 100 in the camera mode. In the camera mode, the control unit 111 operates the image pickup portion 101 to display an image corresponding to the picked-image signal on the display unit 106, that is, the electronic view finder 106A or the liquid crystal display panel 106B. When operation input of the start/stop button 112G is recognized in the above-mentioned image pickup standby state, the recording operation which is performed by the recording/reproducing portion 105 is started. When operation input of the start/stop button 112G is recognized, the recording operation is completed to return the state to the image pickup standby state.

In the camera mode, the control unit 111 receives operation input data caused from the depressing operation of the still-image photographing button 112C. When operation input data caused from the depression operation of the still-image photographing button 112C is received in the image pickup standby state, the picked-image signal obtained from the image pickup portion 101 is captured as a still image at the first depression step of the still-image photographing button 112C. The still image is displayed on the display unit 106. When the still-image photographing button 112C has been depressed to the second depression position, the captured still image is recorded for a predetermined time (seven seconds in this embodiment) by the recording/reproducing portion 105. Also voice during the recording period is recorded by the recording/reproducing portion 105. When the still-image photographing button 112C is not depressed to the second depression position and depression is suspended, a still image which must be recorded by the recording/reproducing portion 105 can be changed. If the still-image photographing button 112C is depressed during the camera recording operation, the control unit 111 causes the recording/reproducing portion 105 for a predetermined time (seven seconds in this embodiment) as a still image. After the recording operation has been completed, the state is returned to the image pickup standby state.

When the operation-mode switch lever 112B is at Position 4, the control unit 111 places the camcoder 100 in the memory mode.

In the memory mode, the control unit 111 forcibly change the operation mode of the image pickup portion 101 to the mode for reading all pixels. When the control unit 111 has received operation input data caused from the depression operation of the still-image photographing button 112C in the memory mode, the control unit 111 captures a picked image obtained by the image pickup portion 101 as a progress scan signal at the first detection position of the still-image photographing button 112C to display the still image on the display unit 106. When the still-image photographing button 112C has been depressed to the second detection position, the control unit 111 records the captured still image on the memory card 110. When the still-image photographing button 112C is not depressed to the second depression position and depression is suspended, a still image which must be recorded on the memory card 110 can be changed.

The picked-image signal obtained by the image pickup portion 101 as the progress scan signal cannot directly be displayed by display portion 106 corresponding to the interlace signal. Therefore, the progress scan signal is converted into an interlace signal so as to be displayed on the display unit 106. In the camera mode, the operation mode of the image pickup portion 101 of the camcoder 100 is switched to the mode for reading all pixels to perform the image pickup operation. A picked-image signal obtained by the image pickup portion 101 as a progress scan signal is converted into an interlace signal so as to be recorded by the recording/reproducing portion 105.

Figure 15A:
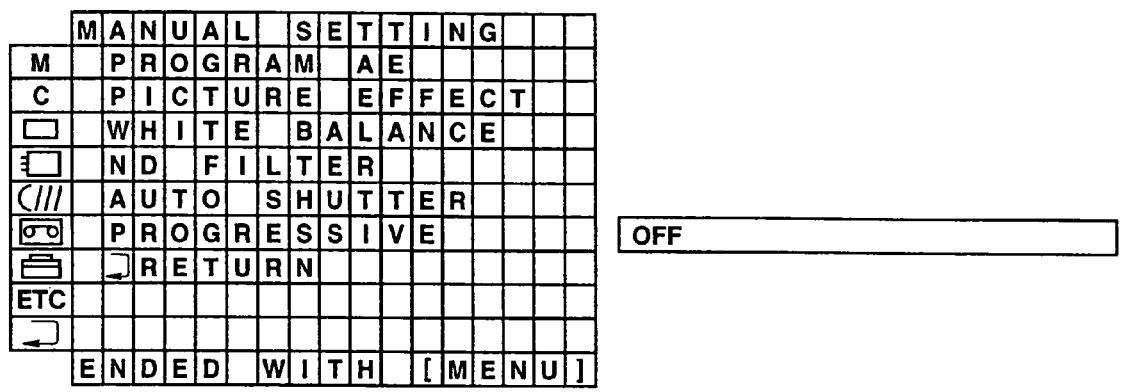
FIG. 15 is a diagram showing setting of the all-pixel reading mode in a camera mode of the camcoder.
Figure 15B:
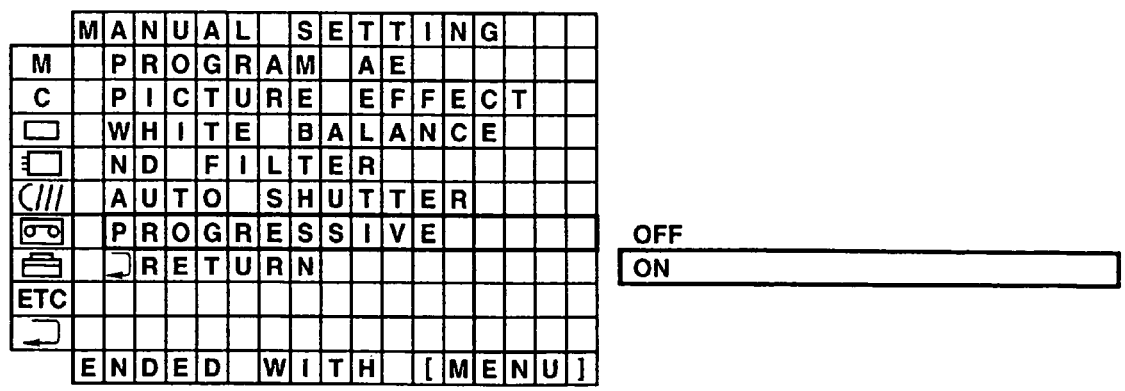

The mode for reading all pixels is set in the camera mode by depressing the menu button 112E provided for the camera body 100A in the photographing standby state to display the menu on the display unit 106. Then, the control dial 112D is turned to switch the progressive from "OFF" to "ON", as shown in FIGS. 15A and 15B. Thus, the mode for reading all pixels can be set.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. An image recording/reproducing apparatus comprising:
   an image signal inputted unit;
   first writing means for writing the image signal from said image signal inputted unit on a first recording medium;
   second writing means for writing the image signal on a second recording medium;
   reading means for reading the image signal from said first recording medium;
   control means for controlling recording/reproducing and data transfer between said first and second recording mediums;
   wherein said second recording medium is connectable to said apparatus;
   wherein an image signal recorded on said first recording medium can be transferred when at least said second recording medium is attached and said second recording medium has available storage capacity,
   wherein image data on the first recording medium includes still image data, dynamic image data, a photoindex, and an index of dynamic image data,
   wherein when the image data is a still image, reproduction is paused, and
   wherein when the image data is a dynamic image, the image data is recorded as the image data is displayed.

2. The image recording/reproducing apparatus according to claim 1, further comprising selecting means for selecting an image signal from the image signals recorded on said first recording medium for recording to said second recording medium.

3. The image recording/reproducing apparatus according to claim 2, wherein said selecting means can select either partial downloading or collective downloading.

4. The image recording/reproducing apparatus according to claim 2, wherein said selecting means can select an image signal according to an index information recorded on said first recording medium.

5. The image recording/reproducing apparatus according to claim 1, further comprising a display which displays a reproduced image signal;
   wherein while an image signal is transferred from said first recording medium to said second recording medium, a correspondent image is displayed on said display.

6. The image recording/reproducing apparatus according to claim 5, wherein in displaying the correspondent image, the reproduction for the correspondent image is paused when a transferred image is a still image and the correspondent image is displayed as it is when a transferred image is a dynamic image.

7. An image recording/reproducing method comprising the steps of:
   inputting an image signal into an image signal inputted unit;
   recording the image signal from said image signal inputted unit on a first recording medium;
   reading the image signal from said first recording medium; controlling recording/reproducing and data transfer between said first and second recording mediums; and
   transferring the image signal recorded on said first recording medium to said second recording medium; wherein said second recording medium is connectable to an image recording/reproducing apparatus;
   wherein an image signal recorded on said first recording medium can be transferred when at least said second recording medium is attached and said second recording medium has available storage capacity,
   wherein image data on the first recording medium includes still image data, dynamic image data, a photoindex, and an index of dynamic image data,
   wherein when the image data is a still image, reproduction is paused, and
   wherein when the image data is a dynamic image, the image data is recorded as the image data is displayed.

8. The image recording/reproducing method according to claim 7, further comprising a selecting step for selecting an image signal from the image signals recorded on said first recording medium for recording to said second recording medium.

9. The image recording/reproducing method according to claim 8, wherein said selecting step can select either partial downloading or collective downloading.

10. The image recording/reproducing method according to claim 8, wherein said selecting step can select an image signal according to an index information recorded on said first recording medium.

11. The image recording/reproducing method according to claim 7, further comprising a display which displays a reproduced image signal;

wherein while an image signal is transferred from said first recording medium to said second recording medium, a correspondent image is displayed on said display.

12. The image recording/reproducing method according to claim 11, wherein in displaying the correspondent image, the reproduction for the correspondent image is paused when a transferred image is a still image and the correspondent image is displayed as it is when a transferred image is a dynamic image.

* * * * *